United States Patent [19]

Katsuura

[11] Patent Number: 4,544,800
[45] Date of Patent: Oct. 1, 1985

[54] CABLE HOLDER

[75] Inventor: Nobuo Katsuura, Yokohama, Japan

[73] Assignee: Nikko Kogyo Kabushiki Kaisha, Tokyo, Japan

[21] Appl. No.: 523,577

[22] Filed: Aug. 16, 1983

[30] Foreign Application Priority Data

Dec. 25, 1982 [JP] Japan .................. 57-226529

[51] Int. Cl.⁴ .......................................... H02G 15/013
[52] U.S. Cl. .................. 174/65 SS; 285/161; 285/343
[58] Field of Search ............... 174/65 SS; 285/249, 285/341, 343, 342, 382.7, 81, 82, 161; 277/110, 115, 117–125, 190, 192

[56] References Cited

U.S. PATENT DOCUMENTS

| 774,402 | 11/1904 | Swain | 277/118 |
| 1,691,574 | 11/1928 | Jerome | 277/118 X |
| 2,355,166 | 8/1944 | Johanson | 285/82 |
| 3,200,366 | 8/1965 | Stuart | 285/161 X |

FOREIGN PATENT DOCUMENTS

| 15418 | 10/1881 | Fed. Rep. of Germany | 277/120 |
| 2132951 | 1/1973 | Fed. Rep. of Germany | 285/343 |

Primary Examiner—A. T. Grimley
Assistant Examiner—D. A. Tone
Attorney, Agent, or Firm—Martin Smolowitz

[57] ABSTRACT

A cable holder for securing a cable airtightly comprises a mounting body with a hollow cylinder for receiving the cable, a clamping cap to be threaded with the thread on the outer periphery of the mounting body and having an opening on each end in its axial direction and frustoconical gripper assembly to be inserted between the cylinder and the clamping cap. The gripper assembly is formed in a shape of a iris diaphragm of a camera and each of the diaphragms is movable and capable of shorting its inner circular diameter defined by the diaphragms for gripping the cable.

8 Claims, 9 Drawing Figures

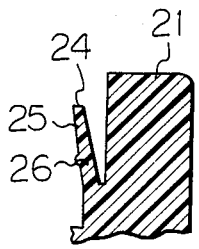
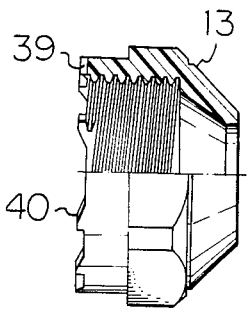
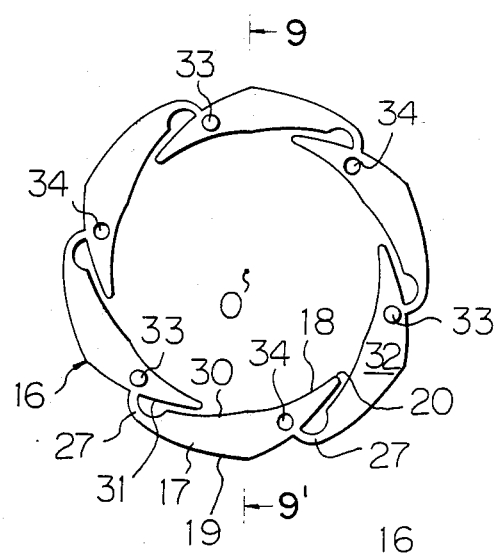
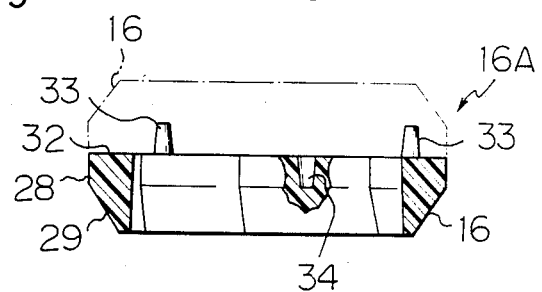

CABLE HOLDER

BACKGROUND OF THE INVENTION

The present invention relates to a cable holder, an more particularly, to a cable holder that is capable of securing the cable airtightly by clamping in the axial direction.

Cables, cords and electric conductors (hereunder collectively referred to as cables) are guided to switch boxes through holders mounted on the wall of the switch boxes. In order to prevent moisture from entering the switch box through the cable holding or clamping portion, the holder must secure the cable airtightly. Many holders have been developed to achieve this purpose, and one such cable holder is disclosed in U.S. Pat. No. 4,373,112. The cable holder of this U.S. patent consists of a hollow cylindrical body to be mounted on a switch box through which the cable is inserted. Part of this cylindrical body is surrounded by the bended portion of a U-shaped belt clamper, the belt wings of which are urged by engagement between a bolt and nut. By screwing the bolt into the nut, the belt wings come closer so that the bended portion of the clamper clamps the cylindrical body to secure the cable to said body.

While this type of holder ensures reliable fixing of cables, the operator must handle the bolt and nut not in the axial direction of the cable, but in a direction vertical to the cable axis, and depending on the place where the cable is used, a screw driver may not be able to have an access to the bolt, and this makes it substantially impossible to execute the clamping operation.

Therefore, cable holders of the type that can clamp the cable by screwing in the axial direction of the cable have been developed.

Typically, a cable holder of this improved type consists of a hollow cylindrical body provided with a female or male thread through which the cable is inserted, a hollow screw cap or chuck having a male or female thread that engages with the female or male thread formed on said hollow cylinder, and a clamper or gripper that is mounted within the hollow cylinder and by which the inserted cable is clamped. As the screw cap is threaded into or onto the hollow cylindrical body, the inside diameter of the gripper which is made of a resilient material decreases by a sufficient degree to urge the cable toward its center and hold it in position. If this urging of the cable toward its center is uniform throughout the circumference of the cable, the clamper will ensure the airtight holding of the cable. In this case, if the clamper and/or any part that cooperates with it has a small opening in the axial direction for receiving the cable, the latter cannot be easily inserted into the holder with the clamper or its associated part accommodated therein. To avoid this problem, the clamper is made of an elastically deformable material such as rubber which enables gradual insertion of the screw cap and which, upon the threading of the screw cap, deforms elastically to urge the periphery of the cable toward the center. Typically, a cable holder of the type described above consists of a hollow cylindrical member having a male thread, a hollow screw cap in a nut form that engages said male thread, and a resilient clamper or gripper that is detachably or permanently mounted on the hollow cylindrical member. The inner wall of the unthreaded portion of the cap nut forms a conical surface tapered toward the opening into which the cable is inserted. As the cap nut is threaded onto the hollow cylinder, the inner conical surface of the nut urges the clamper inwardly to reduce the inside diameter of the clamper until the cable is securely held. In this case, the reduction in the inside diameter of the clamper has a substantially linear relationship with the decrease in the outside diameter of the clamper. As a result, the clamping of the cable requires rotating the cap nut a number of times and, toward the final stage of the clamping operation, the cap nut must be given a particularly powerful rotation.

SUMMARY OF THE INVENTION

The basic concept of the present invention was derived from the iris diaphragm of a camera. This device consists of a plurality of partially overlapping beak shaped unit diaphragms and the outer periphery of each unit diaphragm defines part of the circumference of the same circle, whereas the inner peripheries of the unit diaphragms define an opening for receiving light. By rotating the outer periphery of each unit diaphragm, the overlapping portion of the diaphragms changes slightly but the diameter of the circle defined by their inner periphery changes greatly. The unit diaphragms of the iris diaphragm of a camera are so thin that the inner periphery defined by these unit diaphragms are not effective in clamping or gripping the cable. But these unit diaphragms may be replaced by thick unit blades which are arranged in a plane in a radially overlapping manner. An assembly of these thick unit blades is capable of gripping the cable by the inner circumference defined by the unit blades. As in the case of the iris diaphragm, the outside diameter of this assembly can be reduced by urging each unit blade isostatically toward the center, whereupon the radially overlapping portion of the unit blades is increased to reduce the diameter of the circle defined by the inner periphery of each unit blade. Since the inside diameter of the assembly is decreased more greatly than the outside diameter, a slight urging of the outer circumference of the assembly will reduce its inside diameter by a sufficient degree to enable the quick gripping or clamping of the cable.

The cable holder of the present invention is characterized by using a gripper assembly of the type described above. More specifically, the cable holder of the present invention comprises a mounting body provided with a hollow cylinder for receiving a cable therethrough and having an outer thread formed along its periphery extending toward one end thereof and a funnel-shaped conical surface extending from said one end toward the inner periphery of the cylinder, a clamping cap with an opening on each end in its axial direction and having an internal thread formed along its cylindrical part which engages said outer thread, one end of said clamping cap having an inner conical surface tapered toward said one end with the same inclination as that of said funnel shaped conical surface, and a frusto-conical gripper assembly for gripping the cable which is inserted between said mounting body and said clamping cap and which has an outer conical surface of the same inclination as that of said conical surfaces, said hollow cylinder, clamping cap and gripping assembly being made of an electrically insulating, resilient plastic material, said gripper assembly being provided with a plurality of beaked unit blades which are circularly arranged in such a fashion that the outer periphery of the beak portion of each unit blade overlaps partially and radially with the inner periphery of an immediate adjacent unit blade which is ahead of the beak of said unit blade, the innermost circumferential surface of each unit blade nearer to the tip of the beak portion being concentric with the outermost circumferential surface of the same unit blade remote from said tip of the beak portion, each unit blade being movable along the inner periphery of an immediate adjacent unit blade which is ahead of said unit blade.

BRIEF DESCRIPTION OF THE DRAWINGS

FIG. 6 is a partial enlarged section of a collar;

FIG. 7 is a partial section of a clamping cap;

FIG. 8 is a plan view of the gripper assembly; and

FIG. 9 is a partial cutaway view of FIG. 8 taken along the line, 9—9' wherein the mating gripper assembly is indicated by a phantom line.

DESCRIPTION OF THE PREFERRED EMBODIMENT

Figure 1:
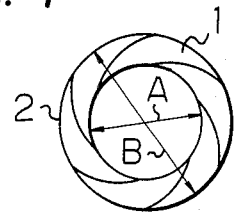
FIGS. 1 and 2 illustrate how the unit blades of the gripper assembly of the present invention move to reduce the diameter of the circle defined by the inner periphery of each unit blade.
Figure 2:
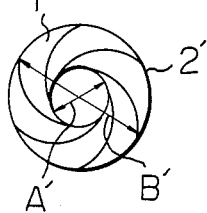
Figure 3:
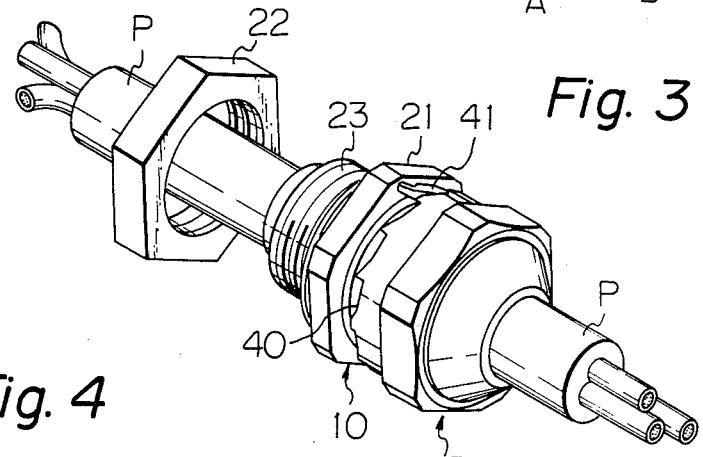
FIG. 3 is a perspective view of the cable holder of the present invention in service.

The operating theory of the gripper assembly of the present invention is hereunder described by reference to FIGS. 1 and 2, which illustrate how the outside and inside diameters of the iris diaphragm of a camera are changed. When unit diaphragms (1) are arranged in a plane in such a manner that they overlap with each other partially and radially, a double circle as shown in FIG. 1 is formed. When the periphery of the outer circle (2) is urged isostatically or uniformly toward the center, the radially overlapping portion of the unit diaphragms is increased and the diameter of the outer circle is decreased as shown by (2') in FIG. 2. In short, the diameters of the inner and outer circles are respectively indicated by A and B in FIG. 1. When the periphery of the outer circle (2) is urged isostatically toward the center, the overlapping part of the unit diaphragms is increased and they move toward the center so as to reduce the diameter of the inner circle. When the diameter of the outer circle is indicated by B', that of the inner circle has been reduced to A', and the rate of reduction in the diameter of the inner circle is far greater than in the case of the outer circle. By a suitable design, the diameter of the inner circle can be reduced by a rate which is even twice as large as that for the diameter of the outer circle. The present inventor has found that a gripper having a greater clamping effect than the conventional gripper can be produced by using the concept of the iris diaphragm of a camera.

One preferred embodiment of the present invention is hereunder described by reference to FIGS. 3 to 9. It comprises a cylindrical member (10) part of which is provided with an outer thread (11) extending to one end which is provided with a funnel-shaped inner conical surface (12) extending toward the inner periphery of the cylinder, a clamping cap (13) with two openings at both ends having formed in its predominant part an internal thread (14) that engages said outer thread 11 and which also has an inner conical surface (15) tapered toward the unthreaded open end with the same inclination as that of the inner conical surface (12), and a frustoconical resilient gripper assembly (16) for insertion between the two inner conical surfaces. The gripper assembly is made of a plurality of unit blades (17) and part of which is provided with an outer conical surface that fits said inner conical surfaces. Each unit blade has a beak and the innermost circumferential surface (18) closer to the tip of the beak (20) is designed to be concentric with the outermost circumferential surface (19) remote from said tip, and the tip portion of the beak of one unit blade is able to move along the inner periphery of the rear part of an immediate adjacent unit blade which is ahead of the beak of said unit blade. In a particularly preferred embodiment (see FIG. 9), two gripper assemblies are put in a back-to-back relationship in such a manner that the bases of the frusta meet together with the unit blades of one assembly being arranged in a staggering position with respect to the other assembly.

Figure 4:
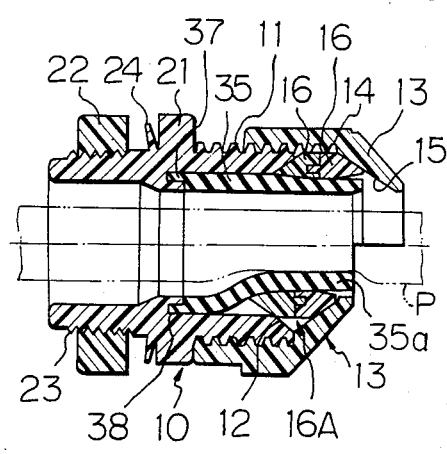
FIG. 4 is a longitudinal section of the holder with the cable indicated by a phantom line, wherein the upper half part of the section shows the holder before it is put to service and the lower half section shows the holder in service.
Figure 5:
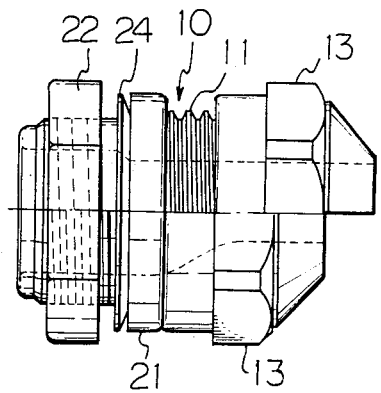
FIG. 5 is a composite view of the holder without a cable, wherein the upper half shows the holder before it is put to service and the lower half shows the holder in service.

As shown in FIGS. 4 and 5, the cylindrical member (10) is provided with an outer thread (11) covering the area extending from an integral mounting collar (21) toward one end. The other end of the cylinder has a larger inside diameter and is provided with another outer thread (23) that engages an installation nut (22). The cylinder also has an integral shallow saucer (24) having its bottom fixed to the collar (21) but having its rim separated from the collar. As shown in FIG. 6, inner surface (25) of the saucer is provided with an annular rib (26). The cylindrical member (10) is made of a flexible thermoplastic resin rather than a completely rigid material. The unit blades (17) of the gripper assembly (16) are made of a resilient synthetic resin and are in the shape of the upper part of a bird's beak.

As shown in FIGS. 8 and 9, the base of the beak of one unit blade is integrally linked by an arched strip (27) with the rear part of an immediate adjacent unit blade which is in front of the beak of said unit blade. The gripper assembly shown in FIG. 8 is composed of six unit blades, and in an assembled form which is shown in FIG. 9, the upper part of one gripper assembly is in a cylindrical form (28) and the lower part is in the form of a downwardly tapered frustum (29) with the same inclination as that of the inner conical surface (12) of the cylindrical member (10) and the inner conical surface (15) of the clamping cap (13). The innermost circumferential surface (18) and the outermost circumferential surface (19) of each unit blade are concentric with respect to the center O of the gripper assembly, but the second innermost circumferential surface (30) contiguous with the rear part of the surface (18) and the second outermost circumferential surface (31) forming that part of the beak facing opposite the second innermost surface (30) are eccentric with the center O of the gripper assembly. The surface (30) and (31) of adjacent blades are arranged concentric with another center (not shown). The upper face of the gripper assembly, or the base (32) of the cylinder (28), is provided on the unit blades with pins (33) which alternate with pin holes (34). The upper face (32) of one gripper assembly is placed on lower face of the other gripper assembly and the pins (33) on one assembly are inserted into the holes (34) in the mating assembly. In this way, a composite gripper assembly indicated by 16A in FIG. 9, wherein the two gripper assemblies are combined at their upper face, is fabricated. In this case, it is preferred that the innermost circumferential surface (18) of each unit blade defines an inner conical surface slightly and inwardly inclined toward the base of the cylindrical part (28).

The embodiment of FIG. 4 includes a cylindrical sealing member (35) that grips the cable inserted into the cylindrical member (10). The thickness of the sealant can be varied according to the diameter of the cable. One end of the sealant is provided with an annular rib (37) which fits into a circular groove (38) formed in an inner step of the cylindrical member (10). The base portion (39) of the clamping cap 13 is provided with teeth (40) as shown in FIG. 7, which catch and hold pawls (41) on the collar (21) so as to prevent backward movement of the cap (see FIG. 3).

The cable holder of the present invention is assembled and put to service in the manner described below. First, the sealant (35) is inserted into the cylindrical member (10) until the rib (37) fits into the groove (38). Then, the composite gripper assembly (16A) is slipped over the cylindrical member (10) so that one of the two conical surfaces of the assembly is brought into loose contact with the inner conical surface (12) of the cylindrical member (10), whereas the other conical surface will be brought into contact with the inner conical surface (15) of the clamping cap (13) threaded onto the cylindrical member (10). The three main components of the cable holder, the cylindrical member (10), the clamping cap (13) and the composite gripper assembly (16A), have been inserted into a switch box and secured thereto by urging a nut (22) against the collar (21). Subsequently, a cable P is forced into the cylindrical member (10) through the clamping cap (13) in such a manner that the sealing member (35) covers the outer surface of the inserted cable. When the cap (13) is threaded onto the cylindrical member (10), the conical surfaces (29) of the composite gripper assembly are urged into close contact with the inner conical surfaces (12) and (15), and as the cap is urged further, the respective mating surface elements (29/12) and (29/15) provide relative movement, and as a result, the composite gripper assembly is subjected to the force resulting from the composition of an axial and inward force and a radial and inward force by means of the relative axial movement between the cylindrical member and cap. Under the radial and inward force, each of the first outermost circumferential surfaces (19) defining the outer circle of the gripper assembly is urged inwardly and each unit blade starts to move along the inner periphery of an immediate adjacent blade which is ahead of the beak of that unit blade. This movement is smooth because the second outermost circumferential surface (31) of one unit blade and the second innermost circumferential surface (30) of an immediate adjacent blade which is ahead of the beak of that unit blade form concentric circles with respect to a point offset with the center O of the composite gripper assembly.

After the outer periphery of each unit blade has moved along the inner periphery of an immediate adjacent unit blade which is ahead of the beak of that unit blade, the circle defined by the first innermost circumferential surface (18) of each unit blade has become smaller in inside diameter but said circle is still concentric with the center O of the composite gripper assembly. Because of this reduction in the diameter of the inner circle, the sealant (35) is urged inwardly to a position indicated by (35a) in FIG. 4 and the cable is held in position. Since the sealant is urged against the cable, the cylindrical member (10) is kept airtight to prevent the entrance of external moisture.

When the clamping cap is threaded onto the cylindrical member (10) in order to hold the cable, the teeth (40) catch the pawls on the collar (21) making a clinking sound. Therefore, one advantage of the cable holder of the present invention is that the operator can hold the cable while checking for the accuracy of his job by listening to the clicking sound. Once the cable is gripped by the holder, the ratchet and pawl mechanism prevents the backward movement of the clamping cap. The collar (21) has the shallow saucer (24) which is contiguous to the collar. Since the rim of the saucer is apart from the collar and the inner surface (25) of the saucer is provided with the annular rib (26), the saucer serves as a washer and the rib enables it to be securely attached to a switch box when the nut (22) is urged against the collar to fasten the cylindrical member (10) onto the switch box.

As described in the foregoing, the cable holder of the present invention has a very simple construction and yet it ensures the airtight holding of the cable within the cylindrical member. As in the conventional technique, the gripping action of the holder is achieved by threading the clamping cap onto the cylindrical member, which causes the gripper assembly to be urged in axial and inward directions, as well as in radial and inward directions. However, as one great advantages, when the clamping cap is turned, the diameter of the inner circle of the gripper assembly is reduced by a greater degree than is the diameter of its outer circle, and therefore, the necessary cable gripping force can be obtained by turning the clamping cap by a much smaller degree than has been required in the conventional technique. Furthermore, two gripper assemblies are combined to make a single gripper assembly and the beaks of the unit blades of the first gripper assembly and those of the unit blades of the second assembly point to opposite directions. Therefore, when the clamping cap is turned in the tightening direction, neither the composite gripper assembly nor the cable will turn in the same direction, and the cable is prevented from turning in its axial direction.

What is claimed is:

1. A cable holder which comprises:
   a mounting body with a hollow cylindrical member for receiving a cable therethrough and having an outer thread formed along its periphery extending toward one end thereof and a funnel-shaped conical surface extending from said one end toward the inner periphery of the cylinder;
   a clamping cap with an opening on each end in its axial direction and having an internal thread formed along its cylindrical part which engages said outer thread, one end of said clamping cap having an inner conical surface tapered toward said one end with the same inclination as that of said funnel-shaped conical surface; and
   a frustoconical gripper assembly for gripping the cable which is inserted between said mounting body and said clamping cap and which has an outer conical surface of the same inclination as that of said conical surfaces to be engageable with the cable, said hollow cylindrical member, clamping cap and gripper assembly being made of an electrically insulating, resilient plastic material, said gripper assembly being provided with a plurality of beaked unit blades which are circularly arranged in such a fashion that the outer periphery of the beak portion of each unit blade overlaps partially and radially with the inner periphery of an immediate adjacent unit blade which is ahead of the beak of said each unit blade, the base of the beak of said each unit blade being integrally linked by an arched strip with the rear part of an immediate adjacent unit blade which is in front of the beak of said each unit blade, a first innermost circumferential surface of each blade nearer to the tip of the beak portion and a first outermost circumferential surface of each unit blade remote from said tip of the beak portion being concentric with respect to the center of the gripper assembly, a second innermost circumferential surface contiguous with the rear part of the first innermost circumferential surface and a second outermost circumferential surface forming that part of the beak facing opposite to the second innermost circumferential surface being eccentric with respect to the center of the gripper assembly but concentric with another center, said each unit blade being movable along the inner periphery of an immediate adjacent unit blade which is ahead of said each unit blade.

2. A cable holder according to claim 1 wherein said gripper assembly is composed of two identical gripper assemblies arranged in a back-to-back relationship so that their tapered frustoconical surfaces point in opposite directions and the unit blades of each assembly will not overlap in the axial direction.

3. A cable holder according to claim 2, wherein said two gripper assemblies are pinned together at their mating faces, so that the unit blades of each gripper assembly point in opposite directions.

4. A cable holder according to claim 1 wherein the part of said mounting body which is closer to the end opposite the part having an outer thread is provided with a collar and another outer thread for installation of the mounting body, said collar being provided with a shallow saucer the base of which is integral with the collar and the inner surface of which faces said another outer thread.

5. A cable holder according to claim 4 wherein the side of said collar facing said first outer thread is provided with pawls that selectively engage teeth provided in the base portion of said clamping cap.

6. A cable holder according to claim 4, wherein said shallow saucer inner surface is provided with an annular rib.

7. A cable holder according to claim 1, wherein said hollow cylindrical member is provided within said mounting body and gripper assembly for securing the cable located therein, said cylindrical sealing member being attached at one end to an inner step of said mounting body.

8. A cable holder which comprises:
a mounting body provided with a hollow cylindrical member for receiving a cable therethrough and having an outer thread formed along its periphery extending toward one end thereof and a funnel-shaped conical surface extending from said one end toward the inner periphery of the cylinder, wherein the part of said mounting body which is closer to the end opposite the part having an outer thread is provided with a collar and another outer thread for installation of the mounting body, said collar being provided with a hollow saucer the base of which is integral with the collar;
a clamping cap with an opening on each end in its axial direction and having an internal thread formed along its cylindrical part which engages said outer thread, one end of said clamping cap having an inner conical surface tapered toward said one end with the same inclination as that of said funnel-shaped conical surface; and
two identical gripper assemblies arranged in back-to-back relationship for gripping the cable which is inserted between said mounting body and said clamping cap and which has an outer conical surface of the same inclination as that of said conical surfaces to be engageable with the cable, said hollow cylindrical member, clamping cap and gripper assemblies being made of an electrically insulating, resilient plastic material, said gripper assemblies being provided with a plurality of beaked unit blades which are circularly arranged in such a fashion that the outer periphery of the beak portion of each unit blade overlaps partially and radially with the inner periphery of an immediate adjacent unit blade which is ahead of the beak of said each unit blade, the base of the beak of said each unit blade being integrally linked by an arched strip with the rear part of an immediate adjacent unit blade which is in front of the beak of said each unit blade, a first innermost circumferential surface of each blade nearer to the tip of the beak portion and a first outermost circumferential surface of each unit blade remote from said tip of the beak portion being concentric with respect to the center of the gripper assemblies a second innermost circumferential surface contiguous with the rear part of the first innermost circumferential surface and a second outermost circumferential surface forming that part of the beak facing opposite to the second innermost circumferential surface being eccentric with respect to the center of the gripper assembly but concentric with another center, said each unit blade being movable along the inner periphery of an immediate adjacent unit blade which is ahead of said each unit blade.

* * * * *